Jan. 27, 1931.  E. GUILLOT  1,790,416
GARMENT MEASURING AND DESCRIPTION DEVICE
Filed July 29, 1929   4 Sheets-Sheet 1

Inventor
Eugene Guillot
by
Wilkinson & Giusta
Attorneys

Jan. 27, 1931.  E. GUILLOT  1,790,416
GARMENT MEASURING AND DESCRIPTION DEVICE
Filed July 29, 1929  4 Sheets-Sheet 2
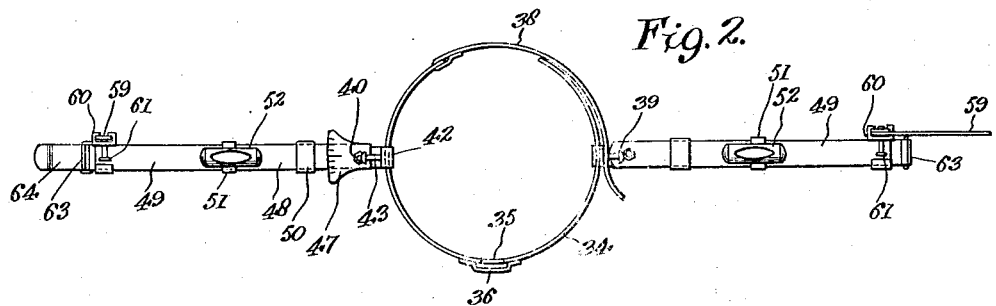
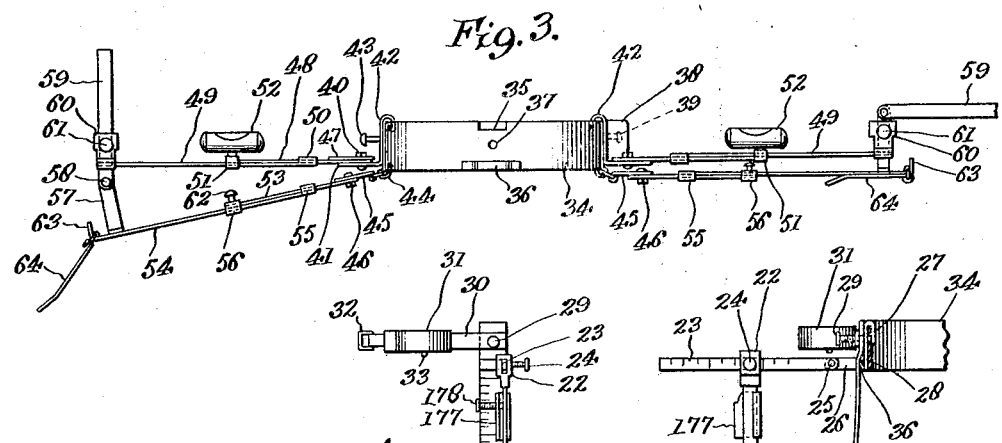
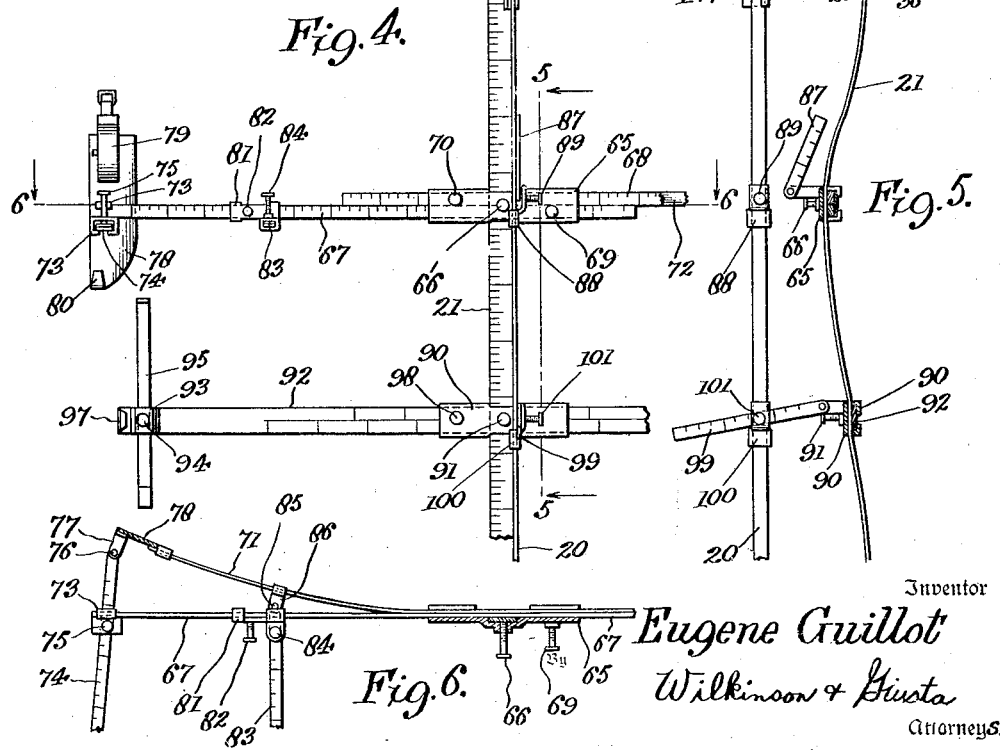
Inventor
Eugene Guillot
Wilkinson & Giusta
Attorneys.

Jan. 27, 1931.  E. GUILLOT  1,790,416

GARMENT MEASURING AND DESCRIPTION DEVICE

Filed July 29, 1929  4 Sheets-Sheet 3

Inventor

Eugene Guillot

Wilkinson & Giusta

Attorneys.

Jan. 27, 1931.  E. GUILLOT  1,790,416
GARMENT MEASURING AND DESCRIPTION DEVICE
Filed July 29, 1929  4 Sheets-Sheet 4
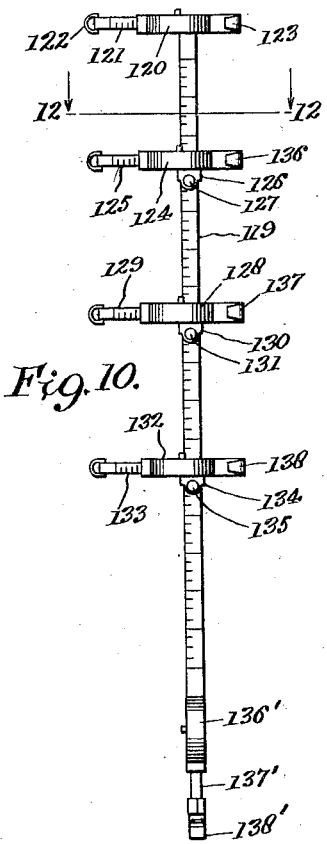
Inventor
Eugene Guillot
By
Wilkinson & Giusta
Attorneys.

Patented Jan. 27, 1931

1,790,416

UNITED STATES PATENT OFFICE

EUGENE GUILLOT, OF HELENA, MONTANA

GARMENT MEASURING AND DESCRIPTION DEVICE

Application filed July 29, 1929. Serial No. 381,876.

The present invention relates to improvements in measuring and form taking devices, and has for an object to provide an improved measuring device for the use of the tailor in taking measurements prior to the custom making of men's coats, trousers, vests, cassocks, women's coats, etc.

Another object of the invention is to provide an improved measuring device which will show the entire and accurate description of the customer, indicating correctly the back as erect, normal, round, stooping, hollow back, head forward, and whether one shoulder blade is smaller than the other.

A further object of the invention is to provide an improved device, which will take the measure across the chest accurately instead of following the present custom, which is merely to say that it is flat, full or regular.

A still further object of the invention is to provide an improved measuring device in which the correct height of the shoulders is given instead of resorting to the present off-hand way in which errors occur owing to the fact that no two tailors will describe the customer's form in the same way.

A still further object of the invention is to provide an improved measuring device for the shoulder, indicating whether the shoulder is very sloping, normal, regular, square or high and showing the measurement to the fraction of an inch.

A still further object of the invention is to provide an improved measuring device in which trouser measurements are accurately taken, showing the height of the waist which is important for men who wear belts. Trouser measurements are very important for the reason that after they are made up height of waist cannot be altered in a satisfactory way. This is also true for the back part of the waist of pants.

A still further object of the invention is to provide an improved measuring device which will take the measurements of the rise the right height of the back and other trouser measurements not now usually taken, whereby a truer and more complete description of the trousers will be furnished.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of an improved measuring device constructed according to the present invention.

Figure 2 is an enlarged top plan view of the improved collar and shoulder measuring device.

Figure 3 is a rear view of the collar and shoulder measuring device.

Figure 4 is a fragmentary rear elevation of the upper portion of the spinal device.

Figure 5 is a side view of the parts shown in Figure 4 also showing the collar arrangement partly broken away.

Figure 6 is a section taken along the line 6—6 in Figure 4.

Figure 10 is a side elevation of the trouser measuring device separated from the trousers.

Figure 11 is an edge view of the same.

Figure 12 is a section taken along the line 12—12 in Figure 10.

Figure 13 is a perspective view of the device for taking the over-all height measurement.

Figure 14 is a side elevation of the trouser cuff measuring device in the spread out condition.

Figure 15 is a section taken along the line 15—15 in Figure 14.

Figures 1, 16, 17:
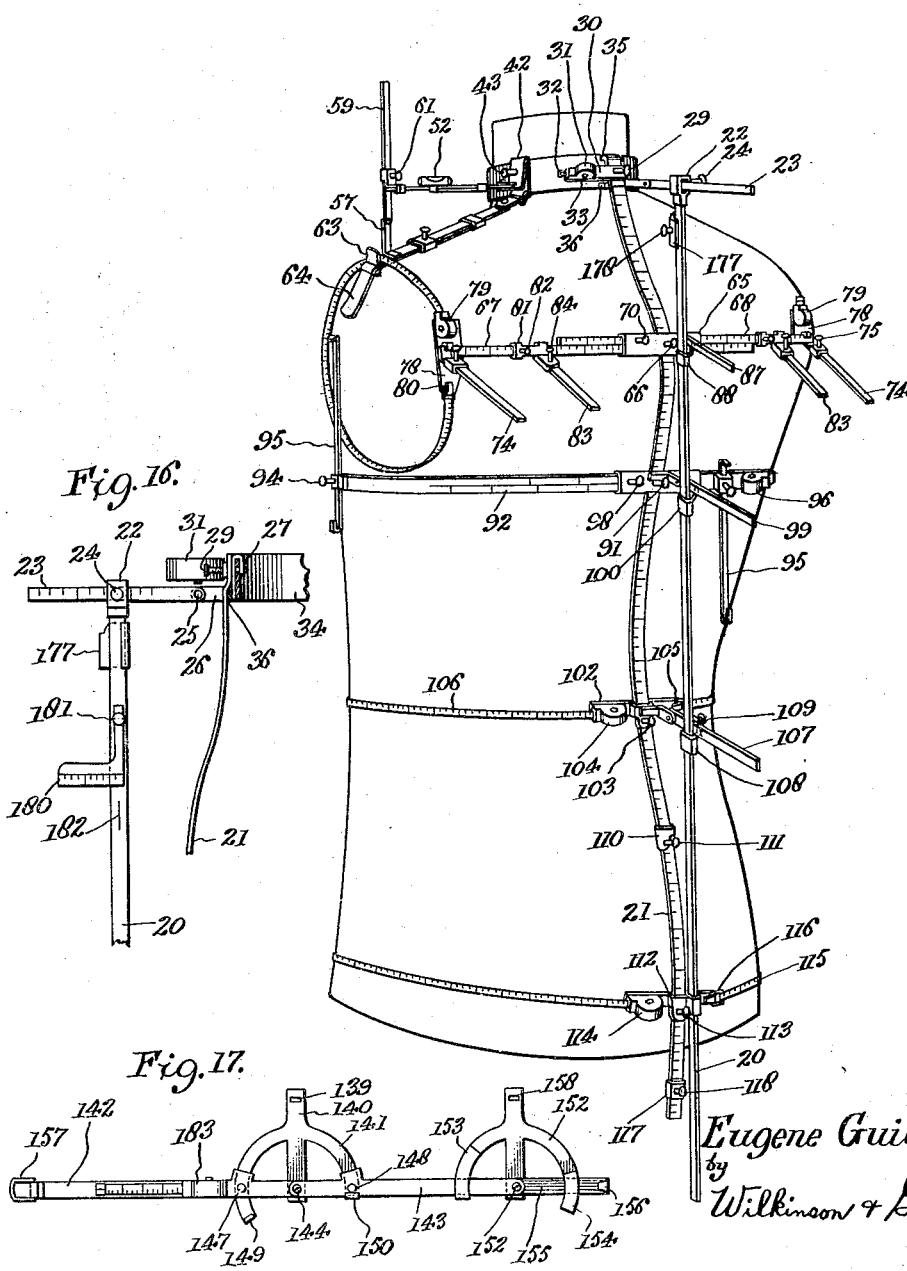
Figure 16 is a side elevation of the parts illustrated in Figure 4 with an attachment for showing if the person is standing erect.
Figure 17 is a side elevation of the trouser measuring device showing a slightly modified form.

Referring more particularly to the drawings, 20 designates a supporting rod of metal or other material possessing sufficient rigidity to maintain and support the various measuring devices. This rod is of a length preferably slightly greater than a man's coat and it is adapted to support a flexible spinal tape 21.

The upper end of the rod 20 is provided with a slotted guide 22 through which plays loosely an arm 23, a set screw 24 being provided in the guide for securing the arm 23 in the adjusted position. The arm 23 is preferably marked off with the graduations of a scale which may be read in conjunction with the slotted guide as hereinafter explained. The outer end of the arm 23 is pivoted, as indicated at 25 to a flange 26 projecting from the spinal measuring tape 21 near its upper end. On this upper end of the spinal measuring tape 21 are formed a pair of spaced hooks 27 and 28, and between the hooks is disposed a set screw 29.

Extending off laterally from one side of the upper end of the spinal tape is an arm 30 carrying a casing 31 in which is mounted a tape measure 32. This tape measure assembly is of the usual form, the tape being wound upon a spring drum, which, when the tape is drawn out will wind the spring; whereby the tape 32 will be drawn back by the spring action into the casing 31. A button 33 projects from the casing 31 for the purpose of releasing the tape when desired.

The collar of the device is designated at 34, and it is provided with a cut-away portion 35 at its rear upper edge for receiving the hook 27 of the spinal tape 21. The collar is also provided with a looped-strap 36 for receiving the other hook 28 of the spinal measuring tape 21. The set screw 29 is adapted to fit through the opening 37 of the collar 34. The collar at its open end is provided with a strap 38 adapted to cooperate with a projection or set screw 39, whereby the collar may be clamped about the form or the person to be measured.

Projecting from the sides of the collar 34 are shoulder measuring devices. These shoulder devices comprise upper and lower members pivoted as indicated at 40 to a flange 41 on a bracket 42 secured to the collar as by a set screw 43. This bracket is also provided beneath the flange 41 with a looped toe 44 to which is pivotally secured a plate 45 to which the lower shoulder member is pivoted as indicated at 46. A protractor 47 is associated with the upper pivot 40 to show if the shoulders are erect or forward. The upper member is composed of the slidable bars 48 and 49 which overlap one another and are provided with the guides 50 and 51 for permitting of the slidable movement of the bars upon one another in lengthening and shortening the shoulder measuring devices.

A spirit level 52 is carried by this upper shoulder member. In a similar manner the lower member is composed of the relatively slidable bars 53 and 54 having the guides 55 and 56 for guiding the same in such sliding movement. The outer end of the bar 54 is provided with an upstanding flange 57 pivoted, as indicated at 58 to the measuring bar 59, which extends up slidably and loosely through a slotted guide 60 having associated therewith a set screw 61 for binding the measuring bar 59 in adjusted position. A set screw 62 is carried by the bar 53 for binding against the companion bar 54 to hold the members against being pulled out or drawn in. At the outer end of the bar 54 a toe 63 is turned up and this toe has pivoted thereto an arm gage 64.

Carried on the spinal tape 21 is a sleeve 65 which slides up and down on the spinal measuring tape 21 and is secured in desired position by the set screw 66. This sleeve 65 is adapted to carry the device for measuring the width of the back of the garment. Two rods 67 and 68 are slidable independently of one another in the sleeve 65 and they both bear scales which are adapted to be read in conjunction with the free ends of the sleeve 65. Set screws 69 and 70 are provided in the sleeves 65 to bind the rods 67 and 68 in the adjusted position.

Associated with these bars 67 and 68 are flexible tapes 71 and 72 which are adapted to conform to the irregularities and contour of the back. These flexible tapes 71 and 72 are secured in the sleeve 65 and at their outer portions are adjustably held by members extending from the rods 67 and 68. The rods are provided on their outer ends with slotted guides 73 through which slide measuring arms 74 secured in adjusted position by set screws 75 associated with the slotted guides 73. The measuring arms 74 are pivoted as indicated at 76 to short flanges 77 upon plates 78 which carry at their upper ends the spring tape measures 79 and at their lower ends the up-turned hooks 80. These plates 78 have affixed thereto the outer ends of the flexible tapes 71. Slidable on the rods 67 and 68 are slotted guides 81. These guides are held in place on the rods 67 and 68 by means of the set screws 82. The slotted guides 81 receive slidably therethrough measuring arms 83 which are bound into adjusted position by means of set screws 84. The arms 83 are pivoted as indicated at 85 to flanges 86 extending from the flexible tapes 71 and 72. The sleeve 65 pivotally carries an arm 87 adapted to slide freely through a slotted guide 88 on the supporting bar 20. A set screw 89 on the guide 88 serves to bind the arm 87 against the supporting bar 20 and to hold the sleeve and the arm fixed to the bar.

Lower down on the spinal flexible measuring tape 21 is a shoulder blade measuring device carried by a sleeve 90 secured in adjusted position on the tape 21 by means of a set screw 91. Through the sleeve is slidable a scale bar 92 having graduations both upon its upper and lower edges adapted to be read respectively in conjunction with the opposite free ends of the sleeve 90. At the ends of the flexible scale bar 92 are slotted guides 93 having set screws 94 to bind the rods 95 therein. At one end of the scale bar 92 is carried a tape box 96 for passing around the body beneath the arms that takes the breast measure and at the opposite end of the bars a hook 97 to receive the loop which is usually provided on the tape. The sleeve 90 is provided with a set screw 98 to hold the scale bar 92 in the adjusted position. This sleeve 90 is also provided with a pivoted arm 99 which slides freely through a guide 100 which is slidably mounted on the supporting rod 20 and carries a set screw 101 for binding the arm 99 against the rod 20.

On the spinal measuring column or tape 21 below the shoulder blade measuring device, is a waist measuring device consisting of a sleeve 102 movable up and down upon the spinal tape 21 and secured in adjusted position by a set screw 103. At one side of the sleeve 102 a tape box 104 is provided and at the other side of this sleeve a hook 105 is provided to receive the loop on the end of the tape 106, which extends about the body at substantially the waist.

The sleeve carries a pivoted arm 107 extending slidably through a slotted guide 108 mounted for movement on the supporting bar 20 and having a set screw 109 for binding the arm 108 against the supporting rod 20 and locking the parts in adjusted position. Below the waist measuring device is a sleeve gage 110 slidably mounted on the spinal tape 21 and having a set screw 111 by which this sleeve is retained in the adjusted position.

Below the gage sleeve is a coat tail measuring device including a sleeve 112 slidably mounted on the spinal tape 21 and having a set screw 113 by which it is secured in adjusted position to the spinal tape. This sleeve carries at one side a tape box 114 in which is carried the flexible measuring tape 115 adapted to extend about the skirt of the coat. At the other end of the sleeve is provided a hook 116 for receiving the loop on the free end of the tape.

At the seat below this tail measuring device is a slidable gage sleeve or guide 117 mounted for movement on the spinal measuring seat tape 21 and having a set screw 118 for binding the same in place.

With regard to the pants measuring device shown in Figures 7 to 12 inclusive and Figures 14 and 15, 119 designates a steel or other tape measuring strip which may be any length, preferably sixteen inches long with degrees in inches from one to fifteen.

Figure 7:
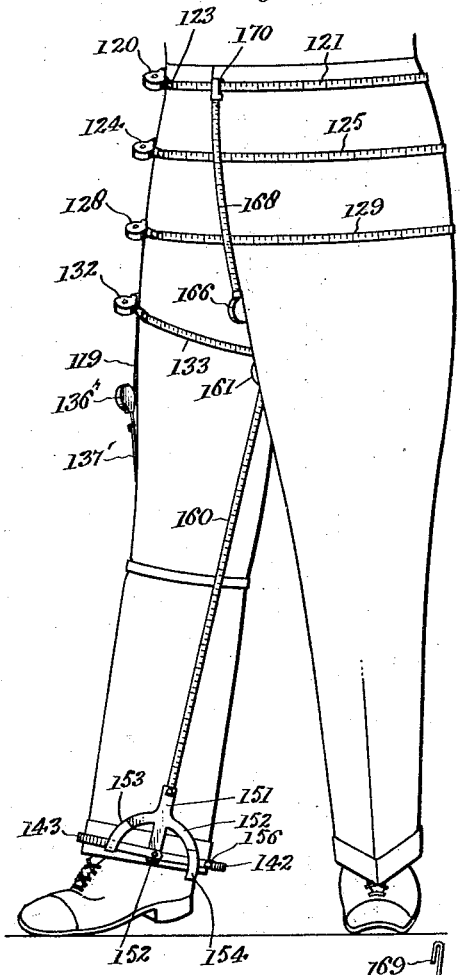
Figure 7 is a perspective view of the trouser measuring device.
Figure 8:
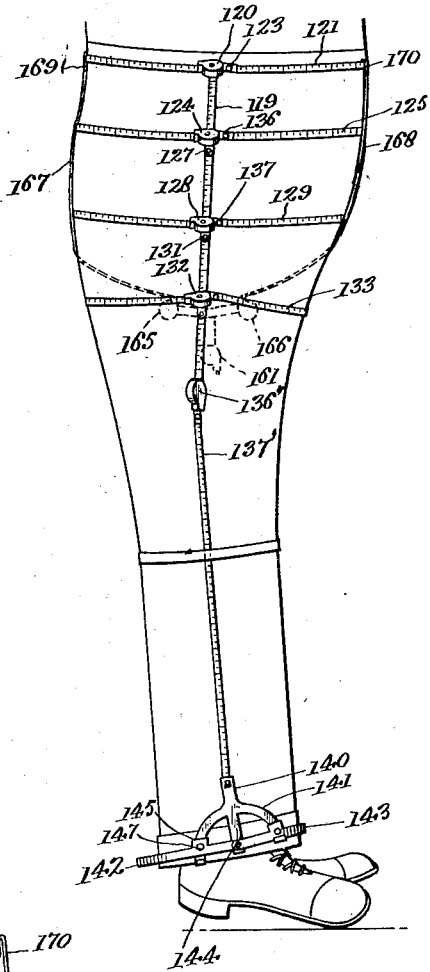
Figure 8 is a side elevation of the same.
Figure 9:
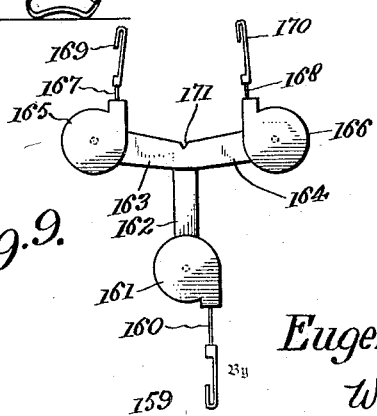
Figure 9 is a side view of the crotch measuring attachment.

At the upper end of this steel tape 119 is a spring measuring tape reel 120 having the flexible steel measuring tape 121 adapted to extend about the waist, as shown in Figures 7 and 8. The loop 122 of the tape is adapted to engage with a hook 123 carried by the steel strip 119.

A spring reel 124 for an abdomen line tape 125 is carried upon the strip 119 below the waist line measure 120. Preferably this reel 124 is carried by a sleeve 126 slidably mounted on the measuring stick or strip 119 and secured in fixed position thereon by a set screw 127.

In a similar way a spring reel 128 for a seat line tape measure 129 is slidably mounted on the measuring strip 119 by the use of a sleeve 130 carrying a set screw 131.

Similarly a spring reel 132 for a thigh line tape 133 is slidably mounted on the measure strip 119 by the use of a sleeve 134 having the set screw 135. Hooks 136, 137 and 138 are carried respectively on slidable sleeves 126, 130 and 134 to hold the loops of the tape measure carried by such reels.

At the lower end of the measuring steel strip 119 is a spring reel 136' for holding a tape 137' for measuring the outside seam length as indicated in Figure 8.

The tape 137' carries a hook 138' which is adapted to engage in the slot 139 shown in Figures 8 and 14, which slot is in the cuff measuring device at the bottom of the trousers. The slot 139 is in the upper end of the vertical bar 140 of the cuff measuring device. This vertical bar 140 is intersected by a curved bar 141. The back tape 142 and the front tape 143 are both pivoted to the lower part of the vertical bar 140 as shown at 144 and they both have sleeves 145 and 146 for sliding over the curved bar 141. Set screws 147 and 148 are provided to secure the sleeves and the front and rear tapes in angularly adjusted position. The curved bar 141 is longer to the rear side of the vertical bar 140 and both free ends of the curved bar 141 are turned up to provide flanges 149 and 150 for arresting the downward swinging movements of the rear and front tapes 142 and 143. The front tape 143 extends over the instep to get the proper length in front. By manipulation of the set screw 148 and swinging of the front tape 143 about its center 144 a straight front or a high front over the instep may be secured. By manipulating the set screw 147, the rear tape 142 may be moved up and down on the longer rear portion of the curved bar 141 for the purpose of securing a straight back or a longer back of the desired length.

The front tape 143 is pivoted to the vertical bar 151, as indicated at 152. The vertical bar extends on the inside of the trousers bottom as indicated in Figure 7. This vertical bar is intersected by the curved bar 152 having the elongated sleeves 153 and 154 to loosely receive the front tape 143 and the side tape 155, which is also pivoted at 152 to the lower part of bar 151. The side tape 155 is provided with a hook 156 to receive the loop or buckle 157 carried by the free end of the rear tape 142 whereby the device is secured about the lower portion of the trousers as shown in Figures 7 and 8. The vertical bar 151 is provided with a slot 158 to receive the hook 159 shown in Figure 9 as being on the end of the tape measure 160 rolled about the spring reel 161. This spring reel 161 is carried by a crotch device which is formed on a triangular frame, the lower leg 162 of which carries the reel 161 and the side arms 163 and 164 of which carry the spring reels 165 and 166 for the flexible tape measures 167 and 168. Hooks 169 and 170 are carried by the tapes 167 and 168 respectively. A notch 171 is provided in the upper central portion of the crotch frame. The tape 160, as shown in Figure 7, is adapted to take the inside seam measure and the scale on this tape 160 is struck off so as to take into account the distance from the reel 161 to the notch 171 which is regarded as the origin point.

The tape 168 is adapted to take the measure of the rise of the waist wanted, and as shown in Figures 7 and 8 the hook 170 of this tape is adapted to engage with the waist tape measure 121. The measurement is also from the notch 171 and the distance from the notch to the tape 168 is taken into account on the graduations of the tape 168. The tape 167 takes the height of the pants wanted from the notch 171.

The notch 171 is placed on the inside seam snug up in the crotch. The tapes 167 and 168, both of which hook on the waist line tape 121, will support the inside portion of the cuff device and the tape 137 will support the outside of the cuff measuring device so that this cuff measuring device will hang down like the leg of the pants, which will give the correct length and a good fitting at the bottom. I may employ a separate tape to measure the outside length from set screw 66 to elbow and to the wrist.

The set screw 29 at the nape of the neck is the starting point for the coat measure. The spring flexible spinal tape 21 will show the form, whether it is erect, head forward, stooping shoulders or round back, straight or hollow back.

In Figure 1 the spinal tape 21 is shown as being curved to conform to the curvature of the back. The rod or bar 20 will, of course, remain straight and in order to permit the flexing of the spinal tape 21, the set screws 24, 89, 101 and 109 are loosened permitting the rods 23, 87, 99 and 107 to move back and forth in the sleeve guides. After the spring tape 21 is properly adjusted to the curvature of the back, the various set screws 24, 89, 101 and 109 are tightened, which will hold and show the form on the spinal tape 21.

When the sleeve 90 is worked up and down it will register on the spinal tape 21 the depth measure of the scye. The steel tape 92, which slides in the sleeve 90 cooperates with the tape measure 96 to take the breast measure. The tape 106 will register the waist line. The sliding sleeve 110 is for the purpose of registering the length of the vest back on the spinal tape 21. The sleeve 112 is intended to be adjusted to the largest part of the seat and the tape 115 will take the seat measure. The slide 117 will register the length of the coat on the spinal tape 21. The bar 67 will register the width of the left half of the back; and the bar 68 will register the right half of the back.

The measurements of these bars 67 and 68 are read at the ends of the sleeve 65. In measuring the left shoulder blade, the tape 92 is brought beneath the arm. The rod 95 is lifted up and the set screw 94 serves to hold it raised. The bar 95 is set against the front of the arm. If the blade measure is ten inches it will measure ten inches from the set screw 94 to the set screw 91 at the center of the back. This ten inch measure will show at the left hand end of the sleeve 90, as shown in Figure 4, and will be read on the upper half of the tape 92, such tape having scales on both its upper and lower edges. The right blade measure will be taken in precisely the same manner as the left, only the lower measure on the tape 92 will be read in connection with the right end of the sleeve 90. The tape 79 goes over the shoulder, around the arm and engages the hook 80 on the plate 78. This tape takes the arm measure. The tape 79 may pass over the shoulder device to hold down bar 54 in position and be confined by the flange 63. The tape 79 may also extend about the set screw 94, if desired to hold up the steel tape 92.

The flexible bars 71, shown in Figure 6, are adjusted cross-wise of the back to conform to the back and this contour will be registered on the bars 74 and 83 and will show the shape of the back.

The slide 83 is on the largest part of the shoulder blade. These slides 74 and 83 will show if the back is flat, round or regular, or if one side of shoulder is larger than the other. The tape measure 31 is adapted to be brought over the shoulder and down to the top button of the vest to take the measure of the opening of the vest and then to take the measure of the length of the vest. The graduated bar 23 will show if the head is forward and stooping or erect.

In order to get the height of a person a bar 172, such as shown in Figure 13 is provided. This bar has pivoted thereto a head piece 173 and carries at or near its lower end a spring tape drum 174 for the measuring tape 175. A foot piece 176 is carried by the tape. The bar 172 is adapted to fit into a sleeve 177 shown in Figure 1 upon the supporting rod 20. A set screw 178 is employed to bind the bar 172 to the supporting rod in the correct position. When the head device is adjusted in place, so that the head piece 173 extends horizontally across above the head of the person and in contact therewith, the tape 175 is pulled down to the floor and the tailor's foot is put upon the foot piece 176 in order to retain the tape in place. The tape will, of course, be graduated to take into account the length of the rod 172 and it will show the height of the person.

The collar and shoulder measuring devices are so used as to get the collar and shoulder measures. The spirit levels 52 enable the upper members of the shoulder measuring devices to be adjusted into the true horizontal. The lower shoulder members consisting of the bars 53 and 54 are adjusted against the shoulder and the measuring slides 59 will show the angular relation between the upper and lower shoulder members and will thus give the degree of the slope of the shoulder. The protractors 47 will show whether the shoulder is forward or backward, the upper shoulder members being adjusted angularly about the pivots 40 for this purpose. Of course, the lower shoulder members will follow pivoting about the centers 46. The lower members will also move up and down angularly about the links 45 so that the lower shoulder members have substantially a universal movement about the collar brackets. The arm gage 64 will be moved up flush against the arm on top of the shoulder to get the correct width of the shoulder on the slide bar 54, which is, of course, graduated. The tape 79 comes over the extended end of the shoulder bar 54 and holds the slide on the shoulder.

A protractor 180 shown in Figure 16 adjustably held by the set screw 181, is used to determine whether the customer stands erect or forward. When set screw 181 is loosened, protractor 180 will balance on bar 20.

The protractor pivots on the set screw 181 and the lower edge of the protractor having a scale as shown will cooperate with a line 182 on the bar 20, whereby to show at the figure on the scale of the protractor which points opposite the index line 182 in just what position the customer stands.

Referring to Figure 17 at a point near the set screw 147, a spring tape 183 is shown for the purpose of taking the size at the bottom of the trousers.

It is obvious that various changes and modifications may be made in the details of construction and design of the above specifically described embodiment of this invention without departing from the spirit thereof, such changes and modifications being restricted only by the scope of the following claims.

What is claimed is:—

1. An improved tailor's measuring device comprising a substantially rigid supporting rod, a spinal flexible measuring tape supported from said rod, a sleeve adjustable up and down on said tape, scale bars adjustably mounted in said sleeve, and a flexible tape carried by said bars for measuring the contour of the back.

2. An improved tailor's measuring device comprising a substantially rigid supporting rod, a spinal flexible measuring tape supported from said rod, a sleeve adjustable up and down on said tape, scale bars adjustably mounted in said sleeve, a flexible tape carried by said bars for measuring the contour of the back, plates carried by said flexible tape, and having hooks thereon and measuring tapes carried by said plates in position to extend about the arms and for interlocking with said hooks.

3. An improved tailor's measuring device comprising a substantially rigid rod, a flexible spinal measuring tape carried by said rod, a slotted guide slidably adjustable on said rod and having means to secure it in adjusted position, a sleeve slidably mounted for movement up and down on said spinal measuring tape and having means to hold it in the adjusted position, a pivoted arm on said sleeve slidable in said slotted guide, and adjustable shoulder measuring devices carried by said sleeve.

4. An improved tailor's measuring device comprising a rod, a flexible spinal tape, sleeves adjustably mounted on said tape, a pivoted arm on each of said sleeves, guides slidable on said rod for slidably receiving said arms and having means to clamp the arms to the rod, measuring means for the contour of the back carried by one sleeve, a shoulder blade measuring device carried by a second sleeve, vertically adjustable rods carried at the outer portions of said shoulder blade measuring device, a hook at one end portion of said shoulder blade measuring device, and a flexible spring measuring tape carried at the other end portion of said shoulder blade measuring device.

5. An improved tailor's measuring device comprising a rod, a flexible spinal tape, sleeves adjustable vertically on said tape, arms pivoted to said sleeves, guides slidably mounted on said rod and slidably and fixedly holding said arms, a hook at one side of each sleeve, and a spring measuring tape carried by the other end of each sleeve for extending about the body and engaging with said hook.

6. An improved tailor's measuring device comprising a rod, a flexible spinal measuring tape associated with said rod, a socket carried by said rod, and a head engaging and height measuring device including an upright adapted to adjustably fit through said socket, a head gage pivoted on the upper end of the upright, and a spring measuring tape reel on the lower portion of said upright.

7. An improved tailor's measuring device comprising a rod, a flexible spinal measuring tape associated with said rod and having spaced hooks at its upper end, a set screw interposed between said hooks, a collar having slots to receive said hooks and an opening to receive said set screw, and a shoulder measuring device carried by said collar.

8. A tailor's measuring device comprising a rod, a spinal flexible measuring tape associated with said rod, a collar detachably connected with said rod, and shoulder measuring devices carried by said collar and each including an upper member composed of slide rules pivoted to swing horizontally and a lower member composed of slide rules and arranged to swing both vertically and horizontally and adapted to be placed on the shoulder, a shoulder gage at the outer end of said lower member, a scale arm pivotally connected with the lower member, and a guide on the lower member for receiving said arm and having means to hold the arm in adjusted position.

EUGENE GUILLOT.